UNITED STATES PATENT OFFICE.

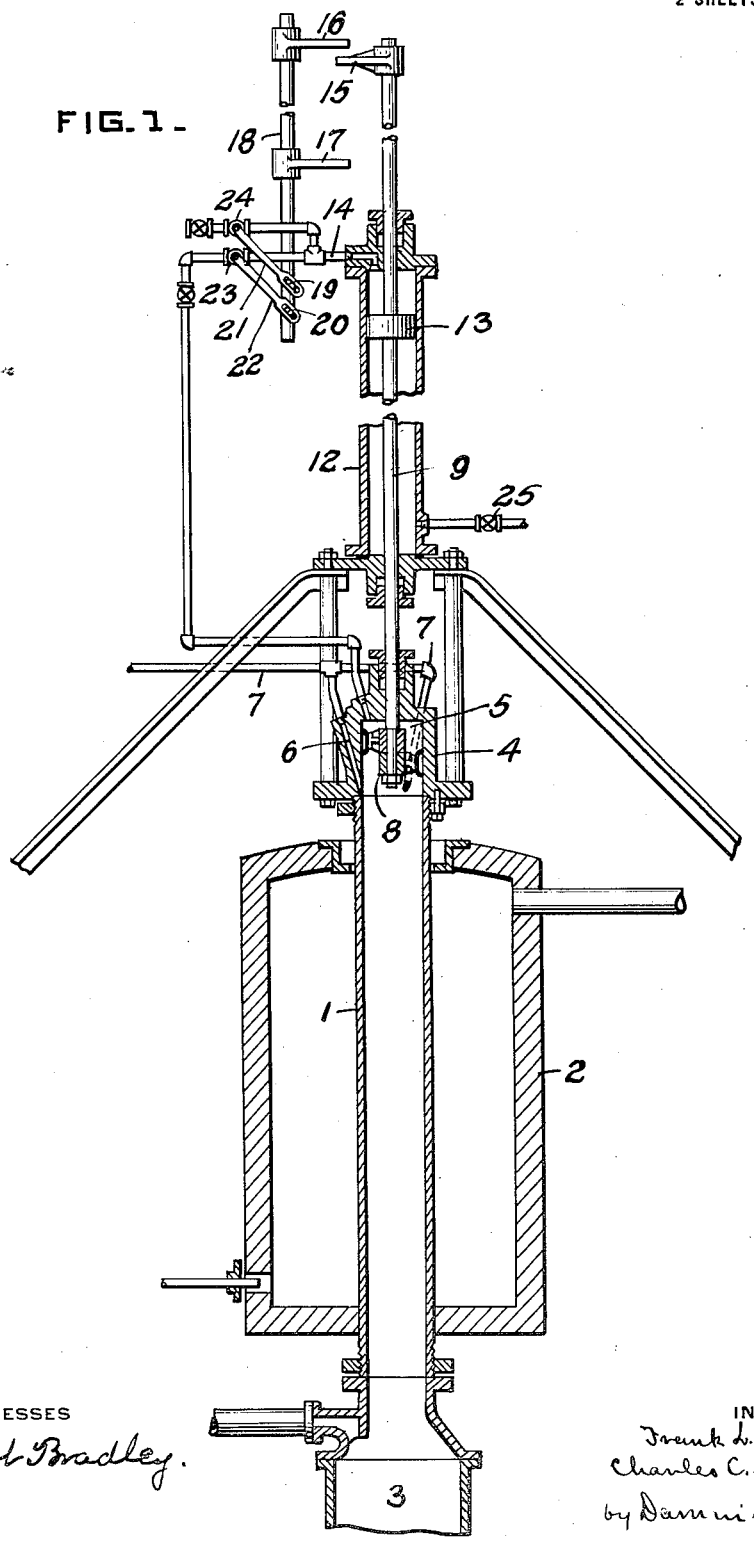

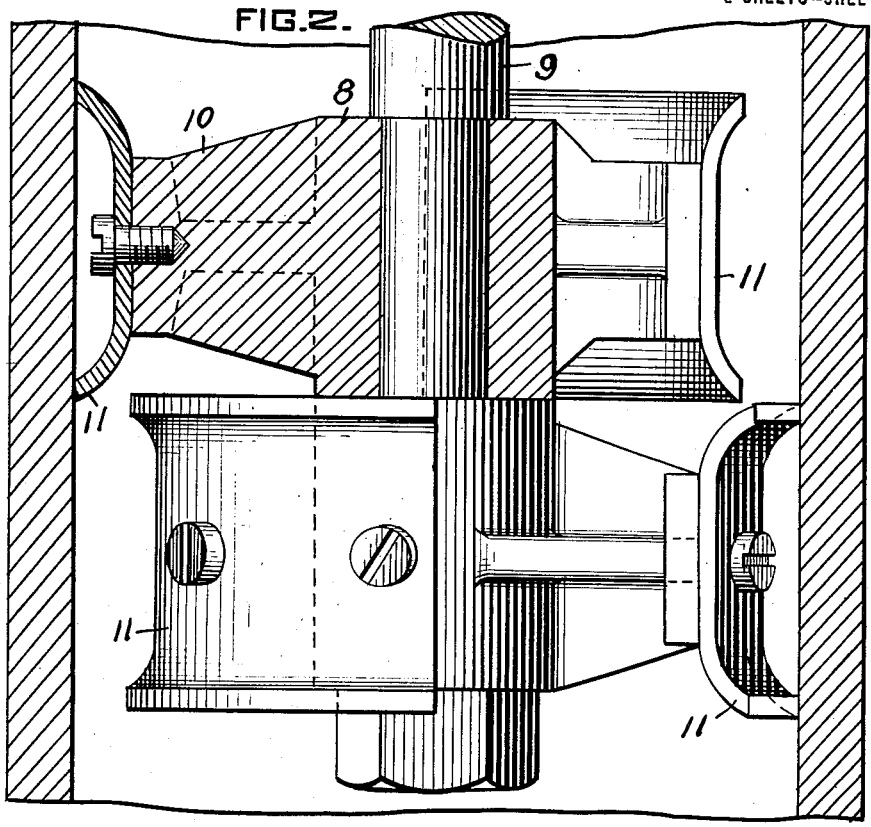
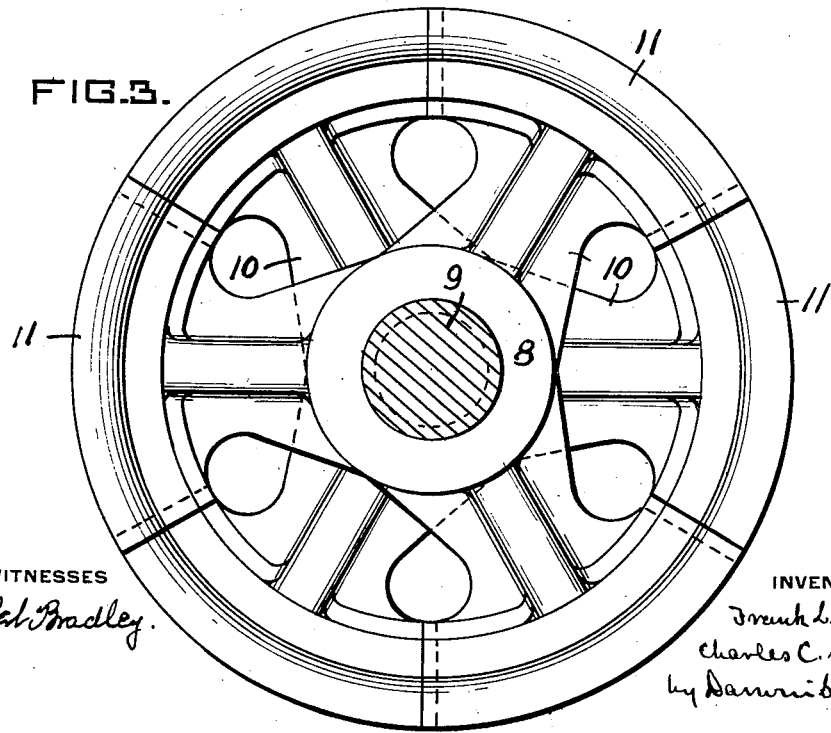

FRANK L. SLOCUM AND CHARLES C. STUTZ, OF PITTSBURGH, PENNSYLVANIA, ASSIGNORS TO SYNTHETIC HYDROCARBON COMPANY, OF PITTSBURGH, PENNSYLVANIA, A CORPORATION OF DELAWARE.

APPARATUS FOR TREATING HYDROCARBONS.

1,304,212.     Specification of Letters Patent.     Patented May 20, 1919.

Application filed April 13, 1916. Serial No. 90,852.

*To all whom it may concern:*

Be it known that we, FRANK L. SLOCUM and CHARLES C. STUTZ, residing at Pittsburgh, in the county of Allegheny and State of Pennsylvania, citizens of the United States, have invented or discovered certain new and useful Improvements in Apparatus for Treating Hydrocarbons, of which improvements the following is a specification.

The invention described herein relates to certain improvements in apparatus for treating materials in accordance with what is known as the Rittman process, which is fully described in Bulletin 114, Department of the Interior, which consists in gasifying and vaporizing the material, such as liquid hydrocarbon, subjecting the gases and vapors to sufficient temperatures to effect a cracking thereof, and maintaining the products of the cracking to a temperature suitable to promote the formation of the desired product. The production of certain hydrocarbons, such as benzene, toluene, and others of the aromatic series in accordance with the Rittman process, is attended with the formation of considerable quantities of carbon in a finely divided condition. The carbon will accumulate rapidly on the inner surfaces of the tube in which the reaction is effected, and reduce the efficiency of the operation. The invention described herein has for its object the provision of means for removing carbon adhering to inner surfaces of the tube without interrupting or in any way interfering with the continuous operation of the process. The invention is hereinafter more fully described and claimed.

In the accompanying drawings forming a part of this specification, Figure 1 is a sectional elevation of apparatus embodying our improvement; Figs. 2 and 3 are sectional elevation and plan respectively, showing the cleaning head.

In the practice of the invention, the tube 1 which may be of desired diameter and length, is arranged in a suitable furnace indicated at 2. This furnace may be of any suitable form or construction. The lower end of the tube is connected to a chamber 3 in which a separation of the carbon and liquid from the gases and vapors is effected.

On the upper end of the tube 1 is secured a casting 4 in which is formed a chamber 5 for the reception of the cleaning head, when not required for removing the carbon from the inner walls of the tube.

A plurality of passages 6 are formed in the walls of the casting, said passages having their outer ends connected by pipes 7 to an oil supply under sufficient pressure to insure the oil entering the tube against the pressure maintained therein. Suitable means are employed to insure that the oil enters the tube in fine jets or sprays, which result may be attained by making the passages small in diameter. It is preferred that the oil should enter the tube below the chamber 5 so that the cleaning head, when at rest, will be out of the zone in which carbon in any considerable quantities is formed. It is also preferred that the passages should be so inclined that the several sprays or jets will intersect at the axis of the tube.

While the cleaning head may be constructed in any manner suitable for the purpose, it is preferred that it should consist of two or more sleeves 8 fitting on the rod 9 and provided with a series of spaced arms 10, having scraping blades 11 attached to their outer ends. These sleeves are so arranged that the one series of scrapers will be intermediate but above the scrapers of the other series, as clearly shown in Figs. 2 and 3.

The rod 9 extends up through a cylinder 12 and is provided with a piston 13 whereby the head may be shifted down as herein described. The upper end of the cylinder is connected by a pipe 14 to a source of fluid under pressure, preferably to the tube 1, so as to utilize the pressure therein for operating the cleaning head. By the admission of pressure medium to the upper end of the cylinder, the cleaning head will be moved down, the scrapers removing the carbon adhering to the inner walls of the tube. When the head has reached the lower end of its movement, pressure medium above the piston is allowed to escape by the opening of a suitable valve, and the unbalanced pressure in the tube 1 on the head will cause a return or upward movement of the head.

While the movements of the head may be controlled by the manual manipulation of valves controlling the flow of the pressure medium to and from the upper end of the cylinder, it is preferred that the operation of the head should be automatic. To this end the portions of the rod 9 above the cylinder, is provided with a finger 15, adapted to strike and shift tappets 16 and 17 on the slide 18. This slide is provided with lugs 19 and 20 through pass arms 21 and 22, connected respectively to valves 23 and 24, the former controlling the flow of pressure medium to the cylinder and the latter the escape of pressure medium from the cylinder. As the head reaches the upper limit of its movement, the finger 15 will strike the tappet 16 and so shift the slide 18 as to open valve 23 and close the outlet valve 24. When the head reaches the lower limit of its movement, the slide will be moved down thereby closing valve 23 and opening valve 24, so that pressure in the tube 1 will force the head up. The rate of movement of the head is regulated by adjusting the outlet valve 24 and a similar outlet valve 25 at the lower end of the cylinder.

We claim herein as our invention:

1. In an apparatus for treating hydrocarbons, the combination of a treating tube, means for feeding hydrocarbons to said tube, means for heating said tube, a cleaning head adapted to be reciprocated in said tube by the fluid pressure generated in the tube.

2. In an apparatus for treating hydrocarbons, the combination of a treating tube, means for feeding hydrocarbons to said tube, means for heating the tube, a cleaning head adapted to be reciprocated in said tube by fluid pressure generated in the tube and means controlled by said head for reversing the direction of movement of the head.

In testimony whereof we have hereunto set our hands.

FRANK L. SLOCUM.
CHARLES C. STUTZ.

Witness:
ALICE A. TRILL.